C. J. SWENSON.
MOTORCYCLE STAND.
APPLICATION FILED APR. 2, 1920.
1,382,330.
Patented June 21, 1921.
Fig. 1.
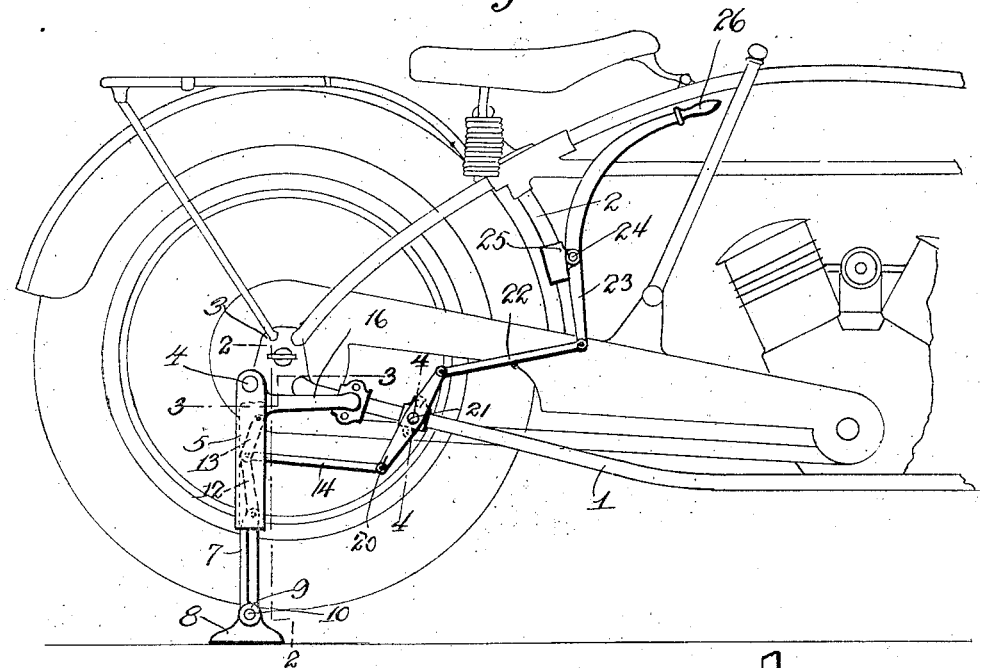
Fig. 2.
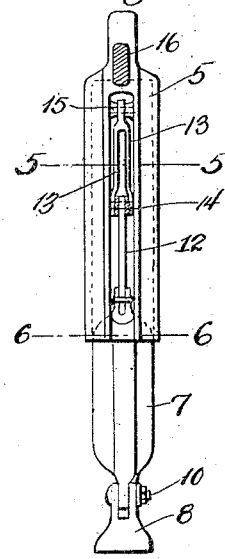
Fig. 3.
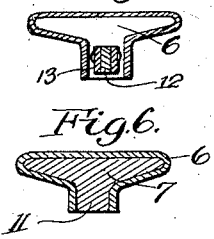
Fig. 4.
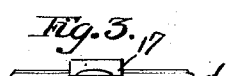
Fig. 5.
Fig. 7.
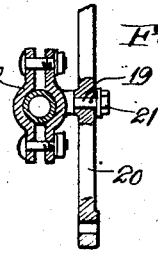
Fig. 8.
Fig. 6.
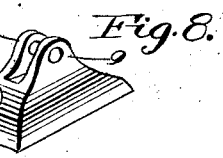
INVENTOR.
Carl J. Swenson
BY
ATTORNEY

UNITED STATES PATENT OFFICE.

CARL J. SWENSON, OF PORT ARTHUR, TEXAS.

MOTORCYCLE-STAND.

1,382,330.

Specification of Letters Patent. Patented June 21, 1921.

Application filed April 2, 1920. Serial No. 370,798.

*To all whom it may concern:*

Be it known that I, CARL J. SWENSON, a citizen of the United States, residing at Port Arthur, in the county of Jefferson and State of Texas, have invented certain new and useful Improvements in Motorcycle-Stands, of which the following is a specification.

This invention relates to attachments for motorcycles and more particularly to an improved motorcycle stand.

The primary object of the invention is to provide a manually releasable stand for the rear end of a motorcycle having means whereby the operator may cause the stand to be moved to inoperative position by a simple movement of a lever located within convenient reach of the operator seated in the saddle.

A further object of the invention is to provide an improved motor cycle stand which will rigidly hold the motorcycle in elevated position so that the rear tire will be held off the ground and which will contain locking means arranged to prevent unlocking of the device until such time as the operator desires.

Another object of the invention is to provide a motorcycle stand which will consist of parts readily adapted to be attached to the motorcycle and which may be conveniently moved therefrom when desired.

Other objects of the invention will appear upon consideration of the following description and accompanying drawings, wherein:—

Figure 1 is a side elevation of a motorcycle showing the rear end construction for illustrating the application of my invention thereto.

Fig. 2 is a section on the line 2—2 of Fig. 1.

Fig. 3 is a section on the line 3—3 of Fig. 1.

Fig. 4 is a section on the line 4—4 of Fig. 1.

Fig. 5 is a section on the line 5—5 of Fig. 2.

Fig. 6 is a section on the line 6—6 of Fig. 2.

Fig. 7 is a perspective view of one of the link members included in the invention, and Fig. 8 is a perspective view of the foot plate.

It will be understood that the parts of the device may be modified to permit it to be attached to motorcycles of different types but for the purposes of the present embodiment of the invention, a conventional motorcycle structure is illustrated in Fig. 1 which includes the frame bars 1 and 2 included in the general structure of the supporting frame. The rear hub plate 3, to which the ordinary motorcycle stands are connected on most machines is provided with a stud 4 having pivotally mounted thereon the sleeve 5 shown in cross section in Fig. 5. This sleeve provides the housing 6 through which is movable the standard 7 provided at its lower end with a foot plate 8, the latter being provided with side ears 9 havings openings through which a pivot pin 10 is extended and the latter projects through a suitable opening in the lower end of the standard. By referring to Fig. 6 it will be noted that both the sleeve and the standard are substantially T-shaped in cross section and the sleeve has an open side through which the ridge or rib 11 extends. The standard is extended into the sleeve and the upper end thereof is pivotally connected to a link 12 which is connected to a complementary link 13, the latter being shown in Fig. 7. The link 13 is longitudinally slotted so that the link 12 may swing through the slot and at the point of connection of the link 12 with the link 13 a pull bar 14 is connected, the same extending through the side opening in the sleeve and being joined to the pivot which connects the two links 12 and 13. The upper end of the link 13 is pivotally mounted on a pivot pin 15 within the housing or sleeve.

The desired rigidity is given to the sleeve by a brace arm 16 extending outwardly from the upper end thereof which is provided with a clamp member 17 attached to the frame bar 1. In this manner the sleeve is held rigidly in a vertical position.

Also attached to the bar 1 of the frame is a clamp member 18 which is provided with a laterally projecting stud 19 having a lever 20 pivoted thereon and held against displacement by a fastening member 21. One end of the pull bar 14 is secured to the lever 20 at its lower end and the upper end of the lever 20 is fastened to a connecting bar 22 which is joined to the lower end of an operating lever 23. The operating lever is pivoted as indicated at 24 on a fastening member 25 which is secured in any preferred manner to the bar 2 of the frame and from this point the operating lever is curved upwardly and terminates in a hand grip 26 disposed within convenient reach of the operator seated in the saddle.

To operate the device it is merely necessary to exert an upward pull on the hand grip 26 thus causing the operating lever to swing on its pivot 24 and moving the connecting bar 22 forwardly by virtue of its connection with the operating lever. This movement of the connecting bar swings the lever 20 on its pivot and forces the link 14 toward the sleeve thus swinging the two links 12 and 13 into the sleeve through the side opening therein and forcing the standard downwardly and out through the end of the sleeve until the foot plate engages the ground whereupon a continued downward movement raises the motorcycle. Fig. 1 shows the two links in dotted lines and in the position they assume when locked in position and it will be noted that the connecting pivot of the two links is swung past the longitudinal center so that a locking means is thus provided which cannot be released until the pull bar 14 is drawn outwardly. This is accomplished by pressing downwardly on the lever 26 causing a reverse movement of the operating parts and pulling the two links outwardly through the open side of the sleeve thus causing the standard to be pulled up into the sleeve and disengaging the foot plate from the ground and permitting the rear wheel to engage the ground. The device therefore, is easily and quickly operated from the seat of the motorcycle and is arranged to be readily attached and detached as desired.

It will be apparent that only slight changes will be necessary to adapt the structure to any type of motorcycle and I desire to point out that I do not desire to limit myself to the exact details of construction illustrated but prefer to make minor changes such as fall within the scope of the appended claims.

What is claimed is:—

1. A motorcycle stand comprising a sleeve fixed to the rear frame structure and having a slot extending longitudinally, a standard projected through the lower end of the sleeve, a pair of links joined together and having their opposite ends joined to the standard and upper end of the sleeve whereby the links may swing into and out of the sleeve through the said slot therein, a pull bar extended through the slot in the sleeve and connected to the connected ends of the links, and means to manually actuate the pull bar for actuating the links whereby the said standard may be drawn into the sleeve or projected beyond the end thereof, said links being arranged within the sleeve with respect to their pivotal connection with the standard and sleeve so that the connected ends of the links may be swung inwardly beyond the longitudinal center and contact with the rear wall of the sleeve to serve as a lock for maintaining the standard in operative position until manually released.

2. A motorcycle stand comprising a vertical sleeve depending from the rear frame structure and having a slot extending longitudinally, a standard slidable within the lower end of the sleeve, a pair of links joined together and having their opposite ends joined to the standard and upper end of the sleeve adjacent the slot, and means joined to the connected end of the links, whereby the latter may be drawn outwardly to raise the standard or swung inwardly past the longitudinal center of the sleeve for lowering and locking the standard in an operative position.

In testimony whereof, I have affixed my signature in the presence of two witnesses.

CARL J. SWENSON.

Witnesses:
L. P. SWENSON,
JULIE SWENSON.